US008676658B2

(12) United States Patent
Marcus et al.

(10) Patent No.: US 8,676,658 B2
(45) Date of Patent: Mar. 18, 2014

(54) METHOD AND SYSTEM FOR DYNAMICALLY GENERATING A GALLERY OF AVAILABLE DESIGNS FOR KIT CONFIGURATION

(75) Inventors: Joshua D. Marcus, Attleboro, MA (US);
Gregory T. Yu, Waltham, MA (US);
Marion Thomas, Lancaster, MA (US);
Susan C. Rice, Northborough, MA (US)

(73) Assignee: Vistaprint Schweiz GmbH, Winterthur (CH)

( * ) Notice: Subject to any disclaimer, the term of this patent is extended or adjusted under 35 U.S.C. 154(b) by 495 days.

(21) Appl. No.: 12/489,090

(22) Filed: Jun. 22, 2009

(65) Prior Publication Data

US 2010/0325016 A1    Dec. 23, 2010

(51) Int. Cl.
*G06Q 30/00* (2012.01)

(52) U.S. Cl.
USPC .................. 705/26.1; 705/37; 705/3; 705/17; 705/26.41; 705/26.81; 705/27.1; 705/26.5; 705/26.62; 715/251; 715/109; 715/246; 715/706; 715/751; 715/234; 715/733; 715/867; 715/759; 715/201; 715/717; 715/763; 715/769; 709/206; 709/223; 709/224; 709/204; 709/219; 709/217; 709/203; 709/207; 709/231

(58) Field of Classification Search
USPC ........................................... 705/26
See application file for complete search history.

(56) References Cited

U.S. PATENT DOCUMENTS

| 7,007,076 B1* | 2/2006 | Hess et al. ..................... 709/219 |
| 7,480,627 B1* | 1/2009 | Van Horn et al. ............ 705/26.2 |
| 7,499,769 B2* | 3/2009 | Walker et al. ................. 700/240 |
| 2005/0102324 A1* | 5/2005 | Spring et al. ............... 707/104.1 |
| 2008/0228599 A1* | 9/2008 | Webb et al. ..................... 705/27 |
| 2010/0030578 A1* | 2/2010 | Siddique et al. .................. 705/3 |

OTHER PUBLICATIONS

Diss. Kurpiers, Joyce. Reality by design : Advertising image, music and sound design in the production of culture. Duke University, ProQuest, UMI Dissertations Publishing, 2009. 3352224.*

* cited by examiner

*Primary Examiner* — Ryan Zeender
*Assistant Examiner* — Fawaad Haider
(74) *Attorney, Agent, or Firm* — Jessica Costa

(57) ABSTRACT

Methods, computer-readable storage media, and apparatuses for dynamically generating a gallery of available designs for a particular kit configuration including a plurality of different products are presented.

18 Claims, 7 Drawing Sheets

Kit Offerings

| 410 KIT A | 420 KIT B | 430 KIT C |
|---|---|---|
| This kit includes: | This kit includes: | This kit includes: |
| 250 Business Cards | 250 Business Cards | 250 Business Cards |
| 20 Folded Note Cards | 100 Return Address Labels | 100 Letterhead |
| 20 Letterhead | 1 Car Magnet | 20 Keychains |
| 1 Pen | 1 T-Shirt | |
| 412 [Select this kit] | 422 [Select this kit] | 432 [Select this kit] |

440 [Create your own kit]

*FIG. 4*

Create Your Own Kit

| 510 Products | 520 Quantity |
|---|---|
| ◉ Business Cards | 250 |
| ○ Post Cards | Select |
| ○ Return Address Labels | Select |
| ○ Notepads | Select |
| ○ Sticky Notes | Select |
| ◉ Letterhead | 100 |
| ◉ Envelopes | 100 |
| ○ Checks | Select |
| ○ Notebooks | Select |
| ○ Rubber Stamps | Select |
| ○ Banners | Select |
| ◉ Car Door Magnets | 2 |
| ○ Flyers | Select |
| ○ Window Decals | Select |
| ○ Posters | Select |
| ○ Lawnsigns | Select |
| ○ Calendars | Select |
| ◉ Mouse Pads | 1 |
| ○ T-shirts | Select |

530 [Show Designs]

*FIG. 5*

| | 911 | 912 | 913 | 914 | 915 | 916 | 917 | 918 |
|---|---|---|---|---|---|---|---|---|
| 910 | ComboID | ProdID | LayoutID | PatternID | Image(s)ID | FontID | ColorID | Keyword(s) |
| | CO-1 | BC-0 | LO-1 | PA-2 | IMG-3 | FS-4 | CS-5 | Palm tree, beach, shell, starfish |
| | CO-2 | NC-2 | LO-2 | PA-2 | IMG-3 | FS-4 | CS-5 | Palm tree, beach, shell, starfish |
| | CO-4 | TS-1 | LO-3 | PA-2 | IMG-3 | FS-4 | CS-5 | Palm tree, beach, shell, starfish |
| | ⋮ | | | | | | | |

| | 921 | 911 |
|---|---|---|
| 920 | ComboFamily | ComboID |
| | CF-1 | CO-1, CO-2, CO-4 |
| | CF-1 | CO-5, CO-6, CO-7 |
| | CF-1 | CO-8, CO-9 |
| | ⋮ | |

| | 931 | 912 |
|---|---|---|
| 730 | KitID | ProductID(s) |
| | KT-0 | BC-0, NC-2, TS-1, MG-0 |
| | KT-1 | BC-0, LH-0, EV-0 |
| | ⋮ | |

*FIG. 9*

METHOD AND SYSTEM FOR DYNAMICALLY GENERATING A GALLERY OF AVAILABLE DESIGNS FOR KIT CONFIGURATION

FIELD OF THE INVENTION

The present invention relates to ecommerce web sites, and more particularly to methods and apparatuses for dynamically generating a gallery of available designs for product bundled into a particular kit configuration.

BACKGROUND OF THE INVENTION

Online vendors of products may vend products that have particular designs printed or otherwise applied on an underlying product. For example, a t-shirt vendor may sell t-shirts that may have different images, text, or other graphics applied thereon. Likewise, online printers may sell various business products such as postcards, notecards, etc., that have different image and/or text content printed thereon.

Many individuals, businesses, and organizations occasionally have a need to purchase a quantity of custom printed materials, such as birth announcements, party invitations, business cards, product or service brochures, promotional postcards, personalized holiday cards, or any number of other things. Many of these individuals and businesses turn to sources such as a local print shop while others rely on any of the various specialized software products available for purchase and installation on an appropriate computer system.

To provide an alternative to the above approaches, printing service providers, taking advantage of the capabilities of the Web and modern Web browsers, provide document design services for user's desiring to create customized documents from any computer with Web access at whatever time and place is convenient to the user. These service providers typically provide their customers with the ability to access the service provider's web site, view product templates, and enter information to create a customized markup language document. In a typical Web-based system, editing is usually limited to allowing the user to add, modify and position text and perhaps upload images for incorporation into the product design. After a document has been designed by the user, Web-based service providers also typically allow the user to place an order for the production and delivery to the user's home or business of quantities of high quality, printed documents of the type that the user is not capable of producing with the printer systems typically connected to most personal computer systems.

An online vendor of multiple products) each of which may be available with different graphical designs appearing thereon) may wish to market their products by grouping multiple products and offering them together as a bundled set or "kit". Generally, a kit offer will include an offer of a lower price for purchasing the entire kit versus the price of purchasing each of the items in the kit individually.

Often, it is desirable to present and offer products together as kits when the design applied to each of the products in the kit appear to closely match one another. For example, in the example above where the vendor is an online provider of business cards, notecards, and other business-related promotional products, a consumer ordering such products may desire to present a coordinated look across all ordered products in order to build a brand for their business. Thus, the online product vendor would desirably offer kit configurations only for those products whose designs closely match one another. However, when an online vendor offers multiple products of different types and designs, there may not exist a matching design for each product in the kit configuration. Accordingly, it would be desirable to have a technique for dynamically generating a gallery containing only those available designs for a particular kit configuration for presentation to a customer.

SUMMARY

The present invention is directed to satisfying the need for systems and methods that provide dynamic and automatic generation of a gallery of kit offerings for a given kit configuration based on an available set of products and associated product designs.

In one embodiment, a method for generating a design-coordinated gallery of available designs for a selected kit configuration comprises receiving a list of products in the selected kit configuration; determining by one or more processors one or more kittable designs from a plurality of available designs associated with different products, each kittable design having associated therewith a set of respective matching designs for each of the products in the selected kit configuration, each of the respective matching designs in a given set belonging to an associated design family; and presenting by one or more processors one or more of the kittable designs as being available for selection for the selected kit configuration.

Other embodiments include computer readable storage media and apparatuses that dynamically generate a gallery of available kit designs for a selected kit configuration.

BRIEF DESCRIPTION OF THE DRAWINGS

FIG. 4 is a simplified representation of an exemplary kit offerings web page showing a gallery of different kit configurations.

FIG. 5 is a simplified representation of an exemplary kit creation web page showing a allowing a user to select various desired products and quantities of products to customize their own kit configurations.

FIG. 9 is a set of relational databases used in one embodiment to dynamically generate a gallery of kit offerings for a given kit configuration.

DETAILED DESCRIPTION

Figure 1:
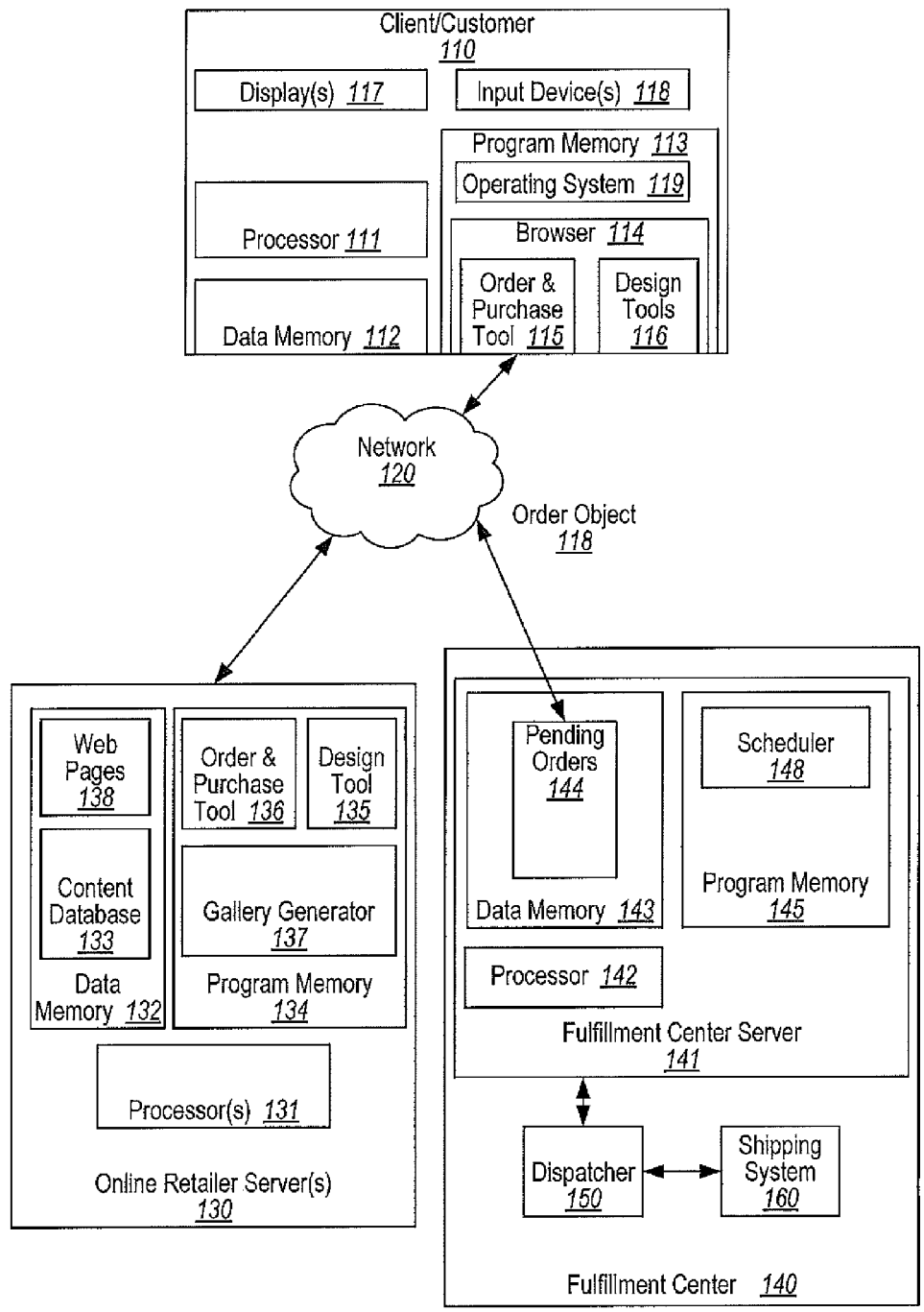
FIG. 1 is a block diagram of a computer system with which the invention may be employed.

Turning now in detail to the various embodiments of the invention, FIG. 1 is a block diagram of an exemplary system 100 in which embodiments of the invention operate. As illustrated, a client computer system 110 being used by a customer or other user connects via a network 120 to the website of an online vendor hosted on one or more server(s) 130 configured to communicate and operate cooperatively, referred to hereinafter as "server 130". The server 130 serves web pages 138 to a browser 114 executing in the client computer's program memory 113 under the control of the processor 111 of the client computer 110. The web pages 138 display items available for ordering by the customer browsing the website. Design tool(s) 116/135 may execute in the client computer browser 114 and/or at the website server 130 to allow the customer to select options for products being ordered and/or to create customized designs for printing on, or otherwise manufacturing, an item being ordered. Order and Purchase tool(s) 115/136 execute in the client computer browser 114 and/or at the server 130 to allow the customer to complete an order and make payment arrangements.

A Fulfillment Center 140 receives completed orders, and retrieves or manufactures the items specified in the order, and ships, delivers, or makes available for pick-up the fulfilled order. In the embodiment illustrated, the Order and Purchase tool(s) 115/136 generate an order object 118, which is transmitted over a network 120 such as the Internet or via a direct connection, to a Fulfillment Center server 141. The order object 118 preferably includes information such as a customer ID, a shipping address, item(s) ordered and associated quantities of ordered items, and other information required by the Fulfillment Center 140 to fulfill the order. The Fulfillment Center server 141 comprises one or more processors 142 connected to the network 120 to receive order objects 118 to process and fulfill. Order objects 118 are stored in pending orders database 144 in data memory 143 until processed by a scheduler 148 executing in program memory 145. The scheduler 148 instructs a dispatcher 150 to fulfill the order by collecting and/or manufacturing all of the items specified in the order object 118. Alternatively, an order specified in an order object 118 may be split into multiple partial orders that may be fulfilled separately. Once an order or partial order has been fulfilled, it may be passed to a shipping system 160 for shipment to the customer. Alternatively, the fulfilled order or partial order may be made available for pickup by the customer or a delivery agent. An exemplary online retailing system and Fulfillment Center is a print job management system of an online printed products vendor, many of the details of which are described in each of U.S. Pat. No. 6,650,433, entitled "Managing Print Jobs", U.S. Pat. Pub. No. 2008/0080006 A1, entitled "Preparation of Aggregate Jobs for Production", and U.S. Pat. App. No. 2008/0080006 A1, entitled "Order Aggregation System And Method", each of which are hereby incorporated by reference in their entirety.

The client computer system 110 includes one or more processor(s) 111 and program and data memory 112, 113. Memory 112, 113 stores computer-readable instructions and data, and may be embodied in any one or more computer-readable storage media of one or more types, such as but not limited to RAM, ROM, hard disk drives, optical drives, CD-ROMs, floppy disks, memory sticks, etc. Memory 112, 113 may include permanent storage, removable storage, and cache storage. In a preferred embodiment, client computer system 110 is a typically equipped personal computer, portable computer, tablet computer or other computer device. The user views images from client computer system 110 on one or more displays 117, such as a CRT or LCD screen, and provides inputs to client computer system 110 via input device(s) 18, such as a keyboard and a mouse.

When client computer system 110 is operating, an instance of the client computer system 110 operating system will be running, represented in FIG. 1 by Operating System 119. In addition, the user may be running one or more application programs. In FIG. 1, client computer system 110 is running Web browser 114, such as Internet Explorer from Microsoft Corporation. In the exemplary embodiment, design tool(s) 116 include one or more product design program(s) downloaded to client computer system 110 via network 120 from the online vendor server 130. Design tool(s) 116 may run in browser 114 or alternatively could be installed in program memory 113. In an embodiment, design tool(s) 116 allow the user to prepare a customized product design in electronic form. In an embodiment, when the customer is satisfied with the design of the product, the design can be uploaded to server 130 for storage and subsequent production of the desired quantity of the physical product on appropriate printing and post-print processing systems. As will be discussed in more detail below, the user creates a custom product design by customizing a template provided by the service provider and adding the user's content.

Server 130 includes program memory 134 and data memory 132. Memory 134, 132 stores computer-readable instructions and data, and may be embodied in any one or more computer-readable storage media of one or more types, such as but not limited to RAM, ROM, hard disk drives, optical drives, disk arrays, CD-ROMs, floppy disks, memory sticks, etc. Memory 134, 132 may include permanent storage, removable storage, and cache storage. Data memory 132 may comprise one contiguous physical computer readable storage medium, or may be distributed across multiple physical computer readable storage media, which may include one or more different types of media. Data memory 132 stores web pages 138, typically in HTML or other web-language format, to be served to client computers 110 and displayed in client browsers 114. Data memory 132 also includes a content database 133 that stores content such as various layouts, patterns designs, color schemes, font schemes and other information used by the server 130 to enable the creation and rendering of product templates and images. Co-owned U.S. Pat. No. 7,322,007 entitled "Electronic Document Modification", and U.S. Pat. Publication No. 2005/0075746 A1 entitled "Electronic Product Design", each describes a Web-based document editing system and method using separately selectable layouts, designs, color schemes, and font schemes, and each is hereby incorporated by reference in its entirety into this application.

Server 130 utilizes a gallery generator 137 which selects and assembles content from the content database 133 to generate a gallery of images of products for display on the display 117 of a client computer 110 to a given customer. As is described in greater detail hereinafter, the gallery generator 137 determines which designs can be offered for a selected configuration. In an embodiment, the gallery generator 137 is implemented as program instructions residing in program memory 134 of the server 130.

When a customer navigates to the website of the online vendor, the server 130 serves a series of web pages 138 to the client's browser 114. The web pages 138 include pages to display images of products available for order from the vendor, pages to receive the customer's product and product option/design selections, and pages to receive payment for ordered products.

Often, it is desirable to bundle together multiple different products into a kit and offer the kit to a customer at a single price. For example, a vendor of products may offer kits to assist the customer in performing a particular project or achieving a particular goal, the performance or achievement of which requires or utilizes all of the prods in the kit. As another example, a vendor may bundle several products into a kit in the hopes of selling more products. In this example, in order to entice the customer to purchase more products, the vendor may set the price of the kit to be lower than the price would otherwise be if the customer were to order each product in the kit individually. Also, it may be desired to select products that are related in some manner so that the customer is more likely to purchase the bundle of different products rather than just the original product that they may have been interested in. For example, a customer ordering business cards may be more easily enticed to buy other business-related products such as business letterhead, envelopes, return address labels, pens and other business promotional products. In addition, when bundling different products together, it may be further desirable to bundle products that have a common design feature. For example, a vendor of a variety of different business products having a variety of different design features may want to bundle together only those different products that have a closely matching design feature in order to present a bundled kit of coordinated products. Thus, a typical customer of the vendor of business products might be a business owner purchasing business cards. Presumably, if the customer were to be presented with a kit offering that included business cards and other products, for example, return address labels, postcards, brochures, t-shirts, mousepads, and/or other promotional products, the customer would prefer to purchase products that have one or more closely matching graphical design features printed or otherwise applied on each of the products in order to present a coordinated brand or look-and-feel to the products used in marketing the business.

Figure 2:
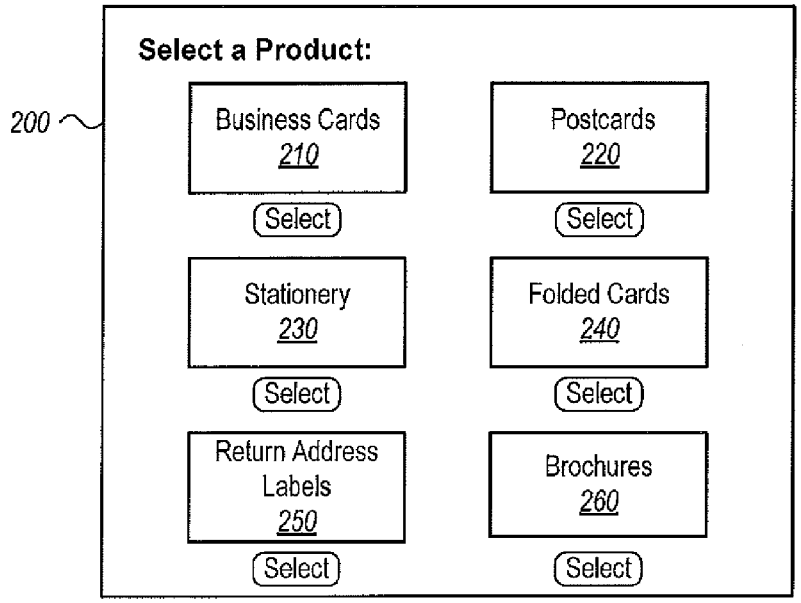
FIG. 2 is a simplified representation of an exemplary online vendor web page showing a gallery of products offered for purchase.

FIG. 2 illustrates a simplified representation of an example web page 200 that may be displayed on a customer's display 117 by an online vendor showing a gallery of available business products offered for purchase by a customer who navigates to the online vendor website. The page displays and promotes various types of products available from the online vendor and provides active controls that allow the user of the client computer 110 to select a desired product for a more detailed presentation of design options. By way of example, FIG. 2 shows promotional images for business cards 210, postcards 220, stationery 230, folded cards 240, return address labels 250, and brochures 260. Images or promotions for different or additional products, such as presentation folders, invitations, announcements, thank you cards, gift tags, mousepads, t-shirts, keychains, and so forth could also be presented along with other information and links. It will be understood that the possible products offered through the website are not limited to documents that are intended for eventual printing The offered products may be any product that has a graphical and/or text design appearing thereon. Furthermore, while the illustrative embodiment described herein is directed to finding matching design templates for multiple user-customizable products, the designs themselves need not be either templates or customizable.

Figure 3:
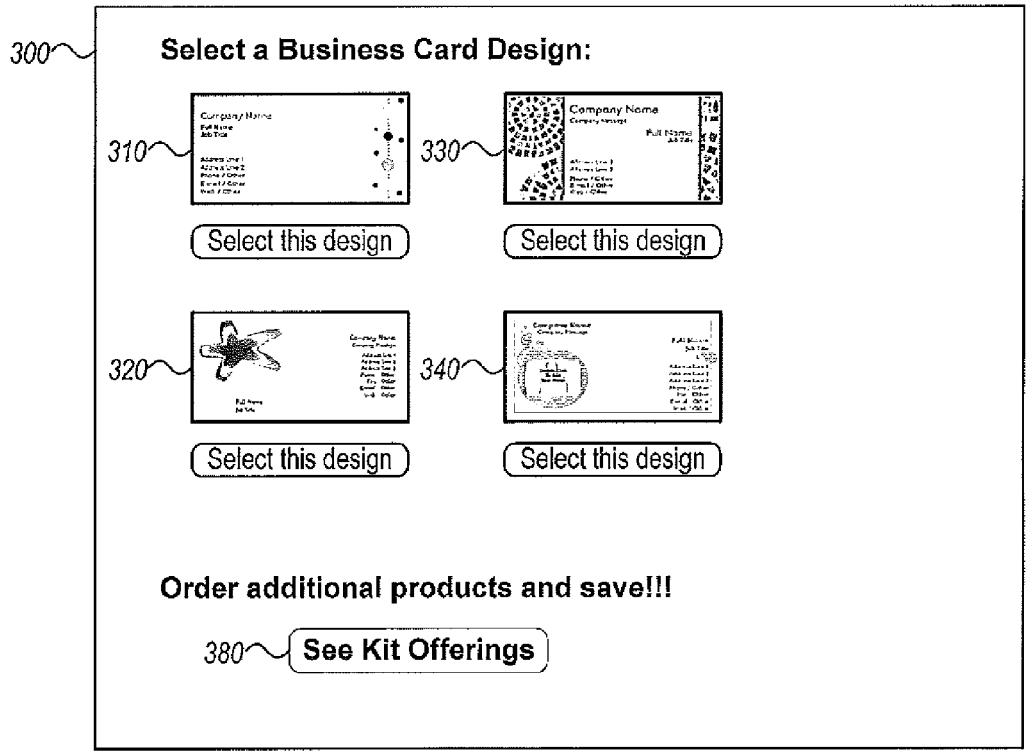
FIG. 3 is a simplified representation of an exemplary online vendor web page showing a gallery of different available designs for a selected product.

Returning to FIG. 2, when a customer clicks on (or otherwise activates) the active control associated with one of the displayed product offerings 210, 220, 230, 240, 250, 260, the user may be presented with another web page which displays details about the selected product and/or which displays a gallery of different offered designs for the product. For example, FIG. 3 is an example representation of a web page 300 presented to the customer after the customer selects one of the products displayed on web page in FIG. 2. For purposes of illustration, it will be assumed that the customer selected the active control associated with the business card product 210. As illustrated, the web page 300 may display a variety of different business card designs 310, 320, 330, 340. Each business card design has an associated active control, such as a radio button or a link, which when activated, causes the server 130 to serve additional one or more web pages 138 to the customer's browser 114 whereby the customer is presented with design and ordering options.

Additionally, the web page 300 may include an offer or a link to display details of an offer for a bundled kit of products. For example, link 380 in web page 300 may advertise and direct a customer to an offer for bundling the business cards with one or more additional different products. In an embodiment, the additional different products are related in some manner. For example, each of the items offered together as a kit may be related by theme (e.g., business cards would presumably be purchased by people in the business world, and hence the related products may include business-related products such as return address labels, brochures, promotional t-shirts, promotional keychains, etc.). In another example, each of the items offered together as a kit may be related as being used together (e.g., a business card holder is used to hold business cards, and hence the business cards may be offered in a kit together with a business card holder). If the customer is interested in a bundled kit offering, the customer may click on the link 380 (or otherwise activate the active control) associated with the offer, and the server 130 may serve a kit offering web page 400 illustrated in FIG. 4. Alternatively, the customer may navigate to, or land on, the kit offering web page 400 via a different web navigation path. In yet other embodiments, the kit offering may be offered on the initial products selection web page, the design selection web page, or any other web pages of the vendor's website.

In the illustrated embodiment, the kit offerings are presented on a kit offering web page 400. The kit offering web page 400 displays and promotes various types of kit offerings available from the online vendor and offers active controls that allow the customer to select a desired kit offering for a more detailed presentation of design options. By way of example, FIG. 4 shows promotions for various bundled kit offerings, such as Kit A 410, Kit B 420, and Kit C 430, each of which offers a different combination of different products that can be purchased together at a single lower overall price. Each kit offering 410, 420, 430 has associated therewith an active control 412, 422, 432 such as a link or button, which when activated indicates to the server 130 that the customer has selected the associated kit offering. Selection by the customer of one of the active controls 412, 422, 432 triggers the gallery generator 137 to dynamically determine and display the available designs for the selected kit configuration.

Alternatively, or in addition, the vendor may allow a customer to configure their own set of products to be bundled into a kit. For example, an online vendor may provide a kit customization web page in the kit path, such as shown in FIG. 5. This web page may be navigated to by means of various paths. By way of example only and not limitation, a "Create your own kit" button 440 may be provided on other web pages, such as the kit offerings web page 400 of FIG. 4. As illustrated in FIG. 5, the product selection web page 500 includes a list of available products 510 that may be selected and combined with other selected products into a kit. Associated with each product description is a selector control (such as a radio button as shown) and a quantity selector (such as a drop-down menu of possible quantities as shown). The product selection page allows the user to select the various products and associated quantities 520 that the user desires to combine into a kit of matching products. Upon completion of the desired product and quantity selections, the user clicks on a "Show Designs" button 530, which triggers the gallery generator 137 to dynamically determine and display the available designs for the selected kit configuration.

At least one of the next few web pages displayed to the customer may be configured to display a gallery of available designs for the selected kit configuration. In one embodiment, it is desirable that each of the kits contain only design-coordinated products. Thus, in order for a product having one or more particular designs elements to be available in a kit offering of the selected kit configuration, at least one version of each of the remaining products in the selected kit configuration must be available that has corresponding closely matching or coordinating design elements. Thus, when bundled together as a kit, all of the products in the kit present a coordinated look. For example, if a selected kit configuration includes business cards, return address labels, magnets, and t-shirts, then in the universe of available business card designs from the online vendor, only those business card designs that have a design element (such as a particular image or graphic) that is also featured in available designs for each of an address label, a magnet, and a t-shirt product can be bundled into a kit of the selected kit configuration. However, because a vendor may not have coordinated or closely matching designs across multiple different product types for every product or for every design, it may not be possible to bundle together a design-coordinated kit for the selected kit configuration for every design. Returning to the above example, suppose a customer selects a business card design with a graphic of a palm tree. Suppose further that the online vendor offers return address labels and magnets with the palm tree graphic, but has not yet ported the design to t-shirts. Since the selected kit configuration in this example includes a t-shirt, the business card design with the palm tree graphic would not be available as a design-coordinated kit because the vendor does not have available any t-shirts with the palm tree graphic, which would be required to present a design-coordinated kit.

Additionally product types and associated product design availability may change over time as new products and product designs are introduced and/or retired by the vendor. Thus, for many online product vendors, the available product types and associated designs is not static. It would therefore be desirable to dynamically generate a gallery of available designs for a given kit configuration based on the currently available set of products and associated product designs.

Figure 6:
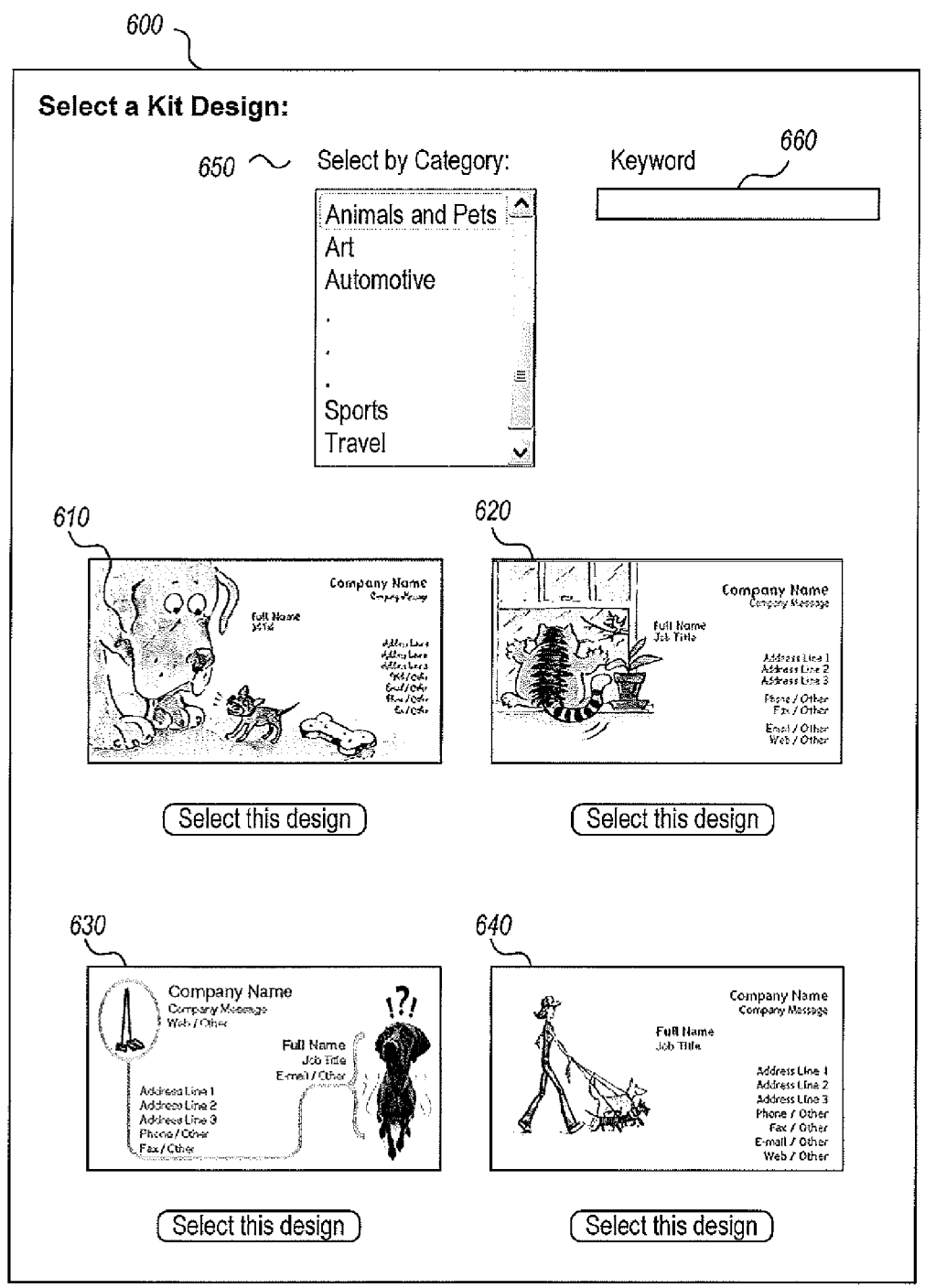
FIG. 6 is a simplified representation of an exemplary online vendor web page showing a gallery of different available designs for a selected kit configuration.

FIG. 6 is an example web page displaying a gallery 600 of available designs for a kit configuration selected by the customer from the kit configuration selection web page 300 in FIG. 3 or from the kit configuration page 500 in FIG. 5. Suppose, for example, that the customer selected Kit A 410 by clicking on Kit A's active control 412. The kit gallery page 600 displays a plurality of designs 610, 620, 630, 640 that are available for the selected kit configuration. In order for a particular design to be available for the selected kit configuration, all products in the selected kit configuration must be available in a closely matching design. That is, each product design must include one or more graphical elements such that when all of the products in the selected kit configuration are presented together, they appear to be intentionally coordinated with one another. More preferably, matching designs for different products are linked by more than one common element, for example a common image along with a common font scheme and a common color scheme. In one embodiment, the common image or graphic is an identical image or graphic available across all products in a selected kit configuration. In another embodiment, the common image or graphic need not be the exact image or graphic, but may be a version of the image or graphic (e.g., different size or aspect ratio) or a derivative of the image or graphic (e.g., a portion of the image), and so need only have the effect of creating in the mind of the viewer an effect that the designs are meant to go together (i.e., are coordinated). For example, a business card may have a design that includes a background image of a palm tree on a beach. A matching design for a return address label may include only the image of the palm tree, whereas a matching design for a notecard may include the image of the palm tree and the beach but displayed in a different aspect ratio. Furthermore, a matching design for a set of sticky notes may include just the image of the beach without the palm tree, and maybe even with an additional element such as a shell. When presented together (and especially when the color scheme and font scheme is the same for all three products), the business cards, return address labels, and notecards, and even the sticky notes, appear to be a coordinated (i.e., "matching") set due to the common visual elements (e.g., beach, palm tree) and/or thematically related elements (e.g., shell) across the set of products.

As previously described, it may be important to present in the gallery 600 of available kit designs only those designs that have design-coordinated products for each of the products in the selected kit configuration. Thus, in order for a product having one or more particular design elements to be available in a kit offering of the selected kit configuration, each of the remaining products in the selected kit configuration must be available in at least one design that has corresponding matching or coordinating design elements.

Figure 7:
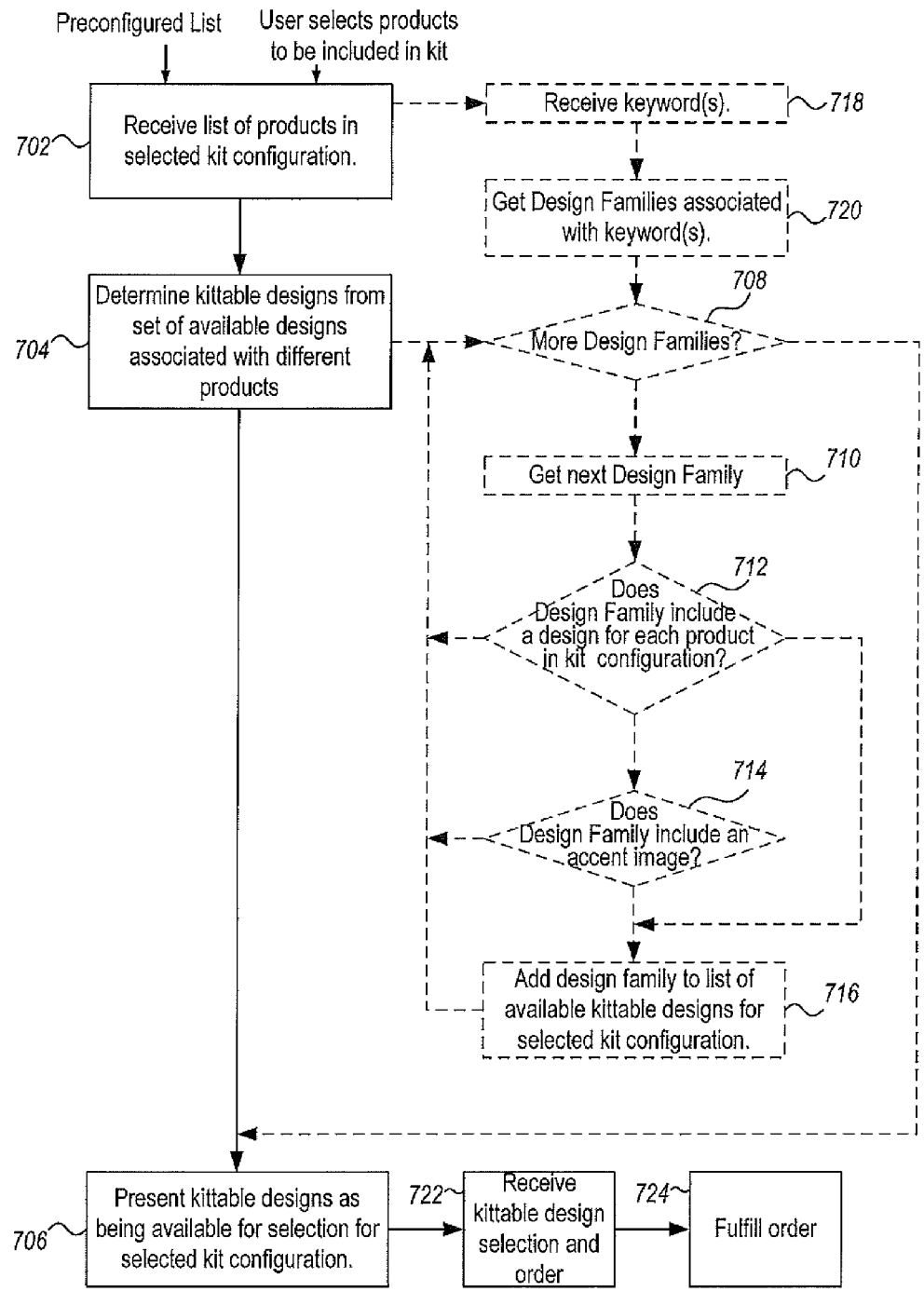
FIG. 7 is a flowchart of an exemplary embodiment of a method for dynamically generating a gallery of kit offerings for a given kit configuration.

FIG. 7 is a flowchart of an exemplary method for generating a design-coordinated gallery of kits for a selected kit configuration. The method may be embodied as computer-readable program instructions stored in program memory 134 and executed by a processor 131, for example at the server 130. As illustrated, the method includes receiving a list of products in the selected kit configuration (step 702). In one embodiment, the list is preconfigured by the kit vendor. In an alternative embodiment, the user selects the individual types and associated quantities of products that the user desires in the kit.

Based on the list of products in the selected kit configuration and the different designs available for each product, the method proceeds to determine which designs of a plurality of different designs are available for the selected kit configuration (step 704). In particular, in an embodiment, in order for any given design (i.e., a kittable design) to be available for the selected kit configuration, all products in the selected kit configuration must be available in a corresponding matching design that belongs to a common (i.e., the same) design family. A design family is a related set of matching designs that, when presented together, are specifically intended to appear to match closely to one another, either by sharing at least one identical image (and preferably, identical font and color schemes), or which are thematically related by distributing a plurality of thematically related but different images (and preferably, identical font and color schemes) across different subsets of the group of designs in the design family. A thematically related image is an image associated with a theme, wherein all images associated with the theme appear to match the theme. For example, if the theme is "beach", a set of thematically related images may include an image of a beach, an image of a starfish, an image of a shell, an image of a palm tree, an image of a beach plus starfish, an image of a beach plus palm tree, an image of a beach plus shell, and images other combinations of the beach, starfish, shell, and/or palm tree. In a thematically related design family, each of the designs in the family incorporates one or more different combinations of these images. Thus, when a product with the image of the beach and palm tree is shown together with each of a product with an image of the beach and shell and a product with an image of the beach and starfish and a product with an image of just the starfish, all four of the products appear to closely match one another via a coordinated thematically related design content even though the design content of each product design is not identical.

Once the set of kittable designs is determined, they are then presented as being available for selection (by the user) for the selected kit configuration (step 706). In an embodiment, the presentation is in the form of a web page gallery of different available kit designs for the selected kit configuration, such as the web page 600 shown in FIG. 6.

In an embodiment, the design family may also include a default accent image which is designed to closely match the image(s) and/or artwork of the other designs in the design family. For a given design family, if a product is not specifically associated with a particular design in the design family, the product may be associated with a default design template associated with the product which includes a placeholder image container, and the accent image specified in the design family may be inserted into the placeholder image container to generate a design for the particular product that closely matches the designs of the other products in that design family. Accordingly, in one embodiment, if a specific matching design associated with a particular product in a specified kit configuration does not exist in a particular design family, a kittable design may still be available for the associated design family by utilizing the default design associated with the particular product and inserting the accent image associated with the design family into the placeholder image container.

Returning to FIG. 7, in an embodiment, the step of determining the available kittable designs includes searching the designs in each design family (steps 708 and 710) to determine whether the design family includes a design associated with each product in the selected kit configuration (step 712), and if so, adding it to a list of available kittable designs for the selected kit configuration (or otherwise marking or noting the availability of the kittable design) (step 716). If not, the design family is not included in the list of available kittable designs, and the next design family is processed preferably until all design families are processed (steps 706-716).

Additionally, in an embodiment, if the design family does not include a specific design associated with a particular product in the selected kit configuration, the method additionally determines whether the design family includes an accent image from which a design for the particular product can be automatically created (step 714). If so, the design family is added to the list of available kittable designs for the selected kit configuration (step 716). If not, the design family is not included in the list of available kittable designs, and the next design family is processed preferably until all design families are processed (steps 706-716).

Additionally, a user may be provided the opportunity to narrow the search of available kit designs by a keyword search. In online vendor websites that offer keyword searching of their product designs, the customer is presented with a keyword entry mechanism (such as an editable text keyword input box 660) through which the customer can enter a keyword associated with the types of designs that the customer desires to view. A keyword is typically a descriptive word or words describing the subject matter of the design content, but can also be associated with designs by other schema as well, such as designer name, design title, design description (e.g., "photographic", "2 images", "green stripes", etc.). For example, the gallery web page 600 may offer one or more pre-configured but selectable categories 650 or a keyword input box 660 that allows the customer to filter the available designs by selected category 650 or input keyword. In such an embodiment, the user may selected a pre-configured category or input one or more keywords that describe or characterize one or more aspects of the type of designs that the user desires to be presented with. In this embodiment, the set of design families to be processed may first be filtered (step 720) using the input keyword(s) (step 718) such that only those design families associated with the input keyword(s) are processed in steps 708 through 716. Of course, the keyword filter step 720 need not be performed first, but could also be performed at any time prior to presentation of the list of available kittable designs in step 706.

After presenting the available kit designs for the selected kit configuration, the method may then receive a kit design selection as selected by a user upon viewing the various available designs and placing of an order for a kit of the selected design (step 722). The vendor fulfills the order (step 724) after placement of the order.

Figure 8:
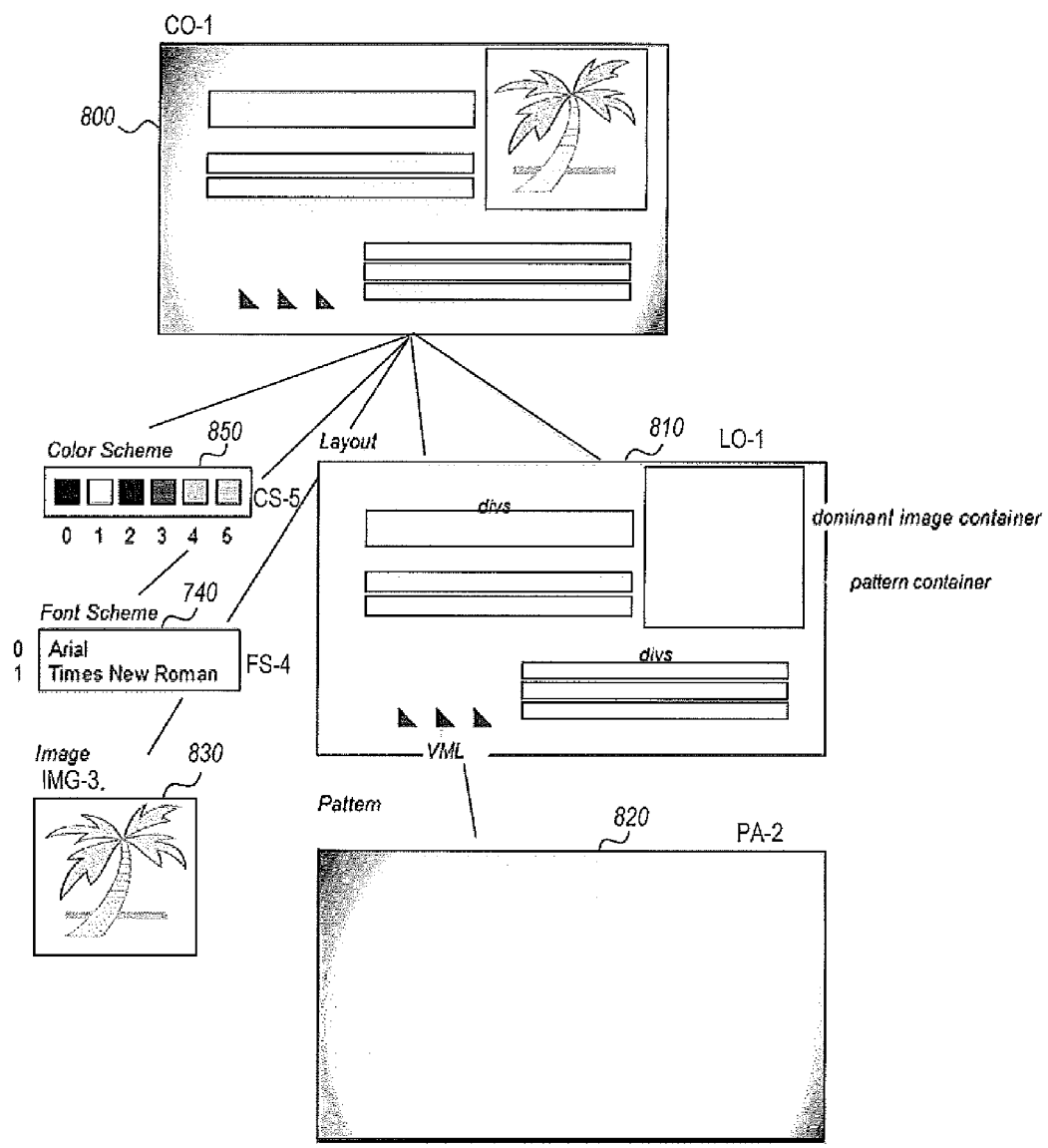
FIG. 8 is a representation of one embodiment of a product design.

Referring now to FIG. 8, there is shown therein an exploded view of a product design, specifically a design template for a business card. The business card product design 800 is created as an electronic document comprising a combination of graphical elements, including a layout 810, a pattern 820, zero or more images 830, a font scheme 840, and a color scheme 850. The electronic document is stored in electronic form, for example implemented using Virtual Markup Language (VML). The layout 810 describes where each element that makes up the final document is to be positioned. The pattern 820 might be a graphic or image and may or may not serve as background imagery. The image(s) 830 are graphics, photographs, artwork, or other image content, generally placed in the foreground of the design. The font scheme 840 defines one or more fonts to be used for any text in the document, and the color scheme 850 defines the palette of colors to be used for the various graphical components of the document.

The server 130 may store multiple different layouts 810, patterns 820, images 830, font schemes 840, and color schemes 850 as separate elements in a content database 133. Each of the multiple different layouts 810, patterns 820, images 830, font schemes 840, and color schemes 850 is associated with a unique identifier and can be combined in various combinations to produce a myriad of different product designs. Thus, referring to FIG. 8, an entirely different business card product design may be created by merely substituting the image 830 with a different image (associated with a different unique identifier). Thus, given such a content database 133 with multiple separately classified graphical elements, the server 130 can quickly and automatically generate multiple different combinations of a layout, pattern, image(s), color scheme, and font scheme, that may be offered as different product designs to the customer.

As just described, different product designs may be dynamically generated in this manner to generate a product design that may be printed onto, or otherwise applied to, a physical product, or that may be embodied in electronic form for display (such as, for example only and not limitation, a web page or an electronic brochure). In one embodiment, the product design is fully automatically generated by the server 130 by mixing and matching different graphical elements of different types without any user content input. In another embodiment, the dynamically generated product design is a template that is fully automatically generated by the server 130 by mixing and matching different graphical elements of different types and is configured with one or more user-editable elements such as user-editable layouts, user-editable text boxes, user-editable images, user-editable font schemes, and user-editable color schemes. In this embodiment, the dynamically generated combination serves as a product template having at least one graphical element that may be edited by the customer to allow the customer to "customize" the design (i.e., content and appearance) on the product.

The content database 133 may include one or more relational databases that associate different graphical elements into one or more combinations that are suitable for one or more products. FIG. 9 is an example of a such a relational database 910, wherein each product type is given a unique product identifier 912, each layout is given a unique layout identifier 913, each pattern is given a unique pattern identifier 914, each image is given a unique image identifier 915, each font scheme is given a unique font scheme identifier 916, and each color scheme is given a unique color scheme identifier 917. The relational database may organize different products, layouts, patterns, images, font schemes, and color schemes into different identifiable combinations, indicated by a unique combination identifier 911, which can be combined to create a product design, for example the design template 800 as shown in FIG. 8.

As illustrated in FIG. 9, the content database 133 may also relate combinations specific to particular products with combinations specific to other products. For example, combinations associated with different products that have one or more common design features (for example, a common graphic or image a common color scheme, etc.) may be related in a relational database 920 as a combination family by a combination family identifier 921. Combinations with a similar design feature (for example, a palm tree image) may be grouped together into a combination family by associating the same combination family identifier 921 to each combination identifier 911 to be included in the family. This may be performed manually by employees or agents of the online vendor, or may be performed automatically by one or more processors grouping combinations with common image (or other graphical element) identifiers into families. If performed automatically, in one embodiment the server 130 or other processor searches the relational database 910 for combination identifiers 911 that have one or more identical graphical element identifiers (914, 915, 916, 917) and associates the matching combination identifiers 911 with a common combination family identifier 921. For example, the server 130 may search the database 910 looking for combination identifiers that are associated with a particular image identifier 915, and from these results searches for combination identifiers having identical color scheme identifiers 917 and font scheme identifiers 916, and then associates this resulting list of combination identifiers with a common combination family identifier 921 in the relational database 920.

As also illustrated in FIG. 9, each combination identifier 911 associated with a given combination family identifier 921 is associated with a product identifier 912. Multiple products (identified by their respective associated product identifiers 812) selected from the same combination family will typically present a coordinated look when displayed together due to the presence of the at least one common design feature in each of the product designs (i.e., across all of the products belonging to the same combination family). Thus, the products belonging to the same combination family (i.e., having the same combination family identifier 821) appear coordinated or to "match" one another via one or more shared common or thematically related graphical elements.

Also illustrated in FIG. 9, each combination may be associated with one or more keyword tags 718 (e.g., "palm tree", "beach", "shell", "starfish") which allows the system to perform a keyword search from keyword(s) input by the customer to retrieve and generate relevant product designs.

In the illustrative embodiment, the resulting product design, such as the combination shown in FIG. 8, may be a template document that includes user-fillable text and/or image containers in which user-entered text and/or images may be inserted to create a final product design which may then be printed onto, or otherwise applied to, the physical product (such as business card paper stock) to create the final product itself. In other embodiments, the combination itself is the final product design—that is, it is not a template that allows user input. For example, the product may be a mug or a t-shirt that is to be printed only with vendor-available designs that do not allow user input customization. In other embodiments, the final product design is not formed as a combination, but is a pre-configured design that is not separable into different graphical elements. For example, a design may be a rasterized custom image designed specifically for application to a particular product.

In one embodiment, as shown in FIG. 8, the content database 133 also stores a relational database 830 associating a plurality of different kit configurations (identified by a kit identifier 831) with each of the product identifiers 812 of the products included in the respective kit configurations. A product vendor can preconfigure different sets of products into different kit configurations, allowing the vendor to decide which products may be bundled together and offered as a kit (generally at a discount over the total individual prices of the products in the kit).

In operation, if the online vendor website offers keyword searching, then in one embodiment, given a keyword entry and a selected kit configuration (identified by a unique kit identifier 931), the gallery generator 137 issues a keyword query to the content database 133 to retrieve all of the combination identifiers 911 associated with one of the product identifiers 912 associated with the kit identifier 931. That is, the gallery generator 137 performs a search of the content database 133 to find all combinations that are associated with both the keyword and a given product in the kit.

If the online vendor website does not offer a keyword searching tool, or if the customer does not enter a keyword, the gallery generator 137 issues a query to the content database 133 to retrieve all combination identifiers 911 associated with one of the product identifiers 912 associated with the kit identifier 931. Since there is no additional keyword filter, the returned query results will typically be more expansive than the results returned from a query having the additional keyword filter layer.

Continuing with the described embodiment, the gallery generator 137 then further refines the search by filtering the resulting set of combination identifiers 911 that satisfied the search criteria (i.e., the returned query results) with an additional constraint—namely that each combination identifier 911 satisfying the initial query must also be associated with a combination family identifier 921 that is associated with a combination identifier 911 associated with each of the product identifiers 912 in the selected kit configuration 931.

While the combination search is presented herein as a multiple queries on the content database due to the content database 133 being implemented as multiple tables (see FIG. 9), those skilled in the art will understand that the desired query results (including each filter) can easily be formed into a single query statement if all of the relevant data (including combination family identifier 931, combination identifiers 911, product identifiers 912, keyword tags 918, etc.) resides in a single database.

In an alternative embodiment, the database 910 may include for each combination identifier 911 a list 919 of product identifiers that the combination identifier 911 can match to. This list may be input by the combination designer (i.e.) a human) or may be calculated by the server 130 or other processor (using the matching technique described above). When performing a query to generate a gallery, the gallery generator 137 can include the list of products 912 in the selected kit configuration 931 as a filter that is compared against the list of matching product identifiers 919 associated with each combination identifier 911. Thus, the returned query results include only those combination identifiers 911 which contain the kit products as a subset. For example, suppose combination A has matching product identifiers {1, 4, 5, 15} and combination B has matching product identifiers {1, 2, 3}. Suppose further that the selected kit configuration must include product identifiers {1, 5}. In this case, combination A is returned in the query results, but combination B is not.

In an embodiment, a combination identifier 910 may be associated with a default image that is specifically designed to appear coordinated to any combination in the same design family. For example, an image of a palm tree that appears in at least some of the images identified by an image identifier 915 and used in the designs (e.g., identified by a combination identifier 910) of a given design family (e.g., identified by a combination family identifier 921) may be designated as a default image associated with the combination identifier 910 or combination family identifier 921. Thus, if a product in the list of products for a given kit configuration is not specifically associated with a design belonging to the design family, the default image can be utilized by the server 130 to automatically create a design for that product that "matches" the designs of the other products in the selected kit configuration.

In addition to or instead of bundling products into kits via the combination family identifier 921, the gallery generator 137 may also be configured to bundle products into kits via a different matching content criteria, such as bundling combinations of products (all of whose identifiers are associated with the selected kit configuration) whose combinations each associate the product identifier with a common graphical element, such as the same image identifier. For example, combinations that include the same image identifier (which is associated with a particular image, e.g., an image of a "palm tree") may be identified via a database query to essentially instruct the processor to find combination families on the fly. That is, in some embodiments, the combination families are determined at the time of the query and therefore combination family identifiers are not determined in advance or stored in the database. The product identifiers associated with the identified combinations are then compared against the list of product identifiers associated with the selected kit configuration, and if a combination exists for each product in the kit configuration, the matching combinations are then bundled into an available kit that may be displayed to the customer in the gallery and ultimately may be selected by the customer for ordering.

While illustrative embodiments have been explained, alternate embodiments could also be employed. For example, while the illustrative embodiments described herein have been directed at designs for printable products, the inventive concepts may likewise be applied to any type of design to be applied or embodied in a product, whether a physical product or an electronic product (such as a web page). Furthermore, while the specific illustrative embodiments for the product designs described herein were directed at template designs for various products that ultimately also included user-editable text and/or image containers that ultimately allowed the customer to personalize the design with personal customer-specific content (such as name and address), the inventive concepts apply more generally to any design that can be applied to a product, whether a template or not a template, and whether further customizable or not. That is, as long as the server has some mechanism for identifying whether a design for a given product "matches" or is otherwise coordinated with a design for another given product, the principles of the invention apply. Therefore, the described embodiments are to be considered as illustrative rather than restrictive and the scope of the invention is as indicated in the following claims and all equivalent methods and systems.

What is claimed is:

1. A computer-executed method for generating a design-coordinated gallery of available designs for a selected kit configuration, the method performed by a computerized system comprising one or more processors executing computer-readable program instructions which direct the computerized system to perform the method, the method comprising:

receiving by the one or more processors a list of products in the selected kit configuration, the selected kit configuration comprising a defined set of a plurality of products offered together for purchase as a single unit;

retaining in one or more computer readable storage media a plurality of content designs each associated with a product identifier identifying a product on which the content design may be embodied, the plurality of content designs grouped into a plurality of content design families wherein the content designs in each content design family are visually coordinated with one another;

based on the received list of products and the retained plurality of content designs, identifying by the one or more processors a set of the plurality of content families that include content designs associated with each product identifier associated with each product identified in the received list of products; and indicating by the one or more processors the designs in the identified set of content families are available for bundling the received list of products into the selected kit configuration;

determining by the one or more processors one or more kittable designs from the indicated designs, each kittable design having associated therewith a set of respective matching designs for each of the products in the selected kit configuration, each of the respective matching designs in a given set of respective matching designs belonging to an associated design family; and presenting by the one or more processors one or more of the kittable designs as being available for selection for the selected kit configuration.

2. The method of claim 1, wherein each of the respective matching designs associated with each respective kittable design comprises at least one identical graphical image.

3. The method of claim 1, wherein each of the respective matching designs associated with each respective kittable design comprises an identical font scheme and an identical color scheme, and at least one identical graphical image.

4. The method of claim 1, wherein each of the respective matching designs associated with each respective kittable design comprises at least one graphical image that is thematically related to at least one graphical image in each of the other respective matching designs in the set.

5. The method of claim 4, wherein each of the respective matching designs associated with each respective kittable design comprises an identical font scheme and an identical color scheme.

6. The method of claim 1, wherein each of the respective matching designs associated with each respective kittable design comprises one or the other of a pre-created matching design configured for its associated product or a default design associated with its associated product and having a default matching accent image inserted therein, the default matching accent image associated with the design family.

7. The method of claim 1, wherein the list of products in the selected kit configuration are pre-configured.

8. The method of claim 1, wherein the list of products in the selected kit configuration are configurable by a customer.

9. The method of claim 1, further comprising:
receiving at least one keyword;
presenting only those kittable designs that are also associated with the at least one keyword.

10. One or more non-transitory computer readable storage medium tangibly embodying program instructions which, when executed by a computer, implement a method for generating a design-coordinated gallery of available designs for a selected kit configuration, the method comprising:
receiving by the one or more processors a list of products in the selected kit configuration, the selected kit configuration comprising a defined set of a plurality of products offered together for purchase as a single unit;
retaining in one or more computer readable storage media a plurality of content designs each associated with a product identifier identifying a product on which the content design may be embodied, the plurality of content designs grouped into a plurality of content design families wherein the content designs in each content design family are visually coordinated with one another;
based on the received list of products and the retained plurality of content designs, identifying by the one or more processors a set of the plurality of content families that include content designs associated with each product identifier associated with each product identified in the received list of products;
and indicating by the one or more processors the designs in the identified set of content families are available for bundling the received list of products into the selected kit configuration;
determining by the one or more processors one or more kittable designs from the indicated designs each kittable design having associated therewith a set of respective matching designs for each of the products in the selected kit configuration, each of the respective matching designs in a given set of respective matching designs belonging to an associated design family;
and presenting by the one or more processors one or more of the kittable designs as being available for selection for the selected kit configuration.

11. The one or more computer readable storage medium of claim 10, wherein each of the respective matching designs associated with each respective kittable design comprises at least one identical graphical image.

12. The one or more computer readable storage medium of claim 10, wherein each of the respective matching designs associated with each respective kittable design comprises an identical font scheme and an identical color scheme, and at least one identical graphical image.

13. The one or more computer readable storage medium of claim 10, wherein each of the respective matching designs associated with each respective kittable design comprises at least one graphical image that is thematically related to at least one graphical image in each of the other respective matching designs in the set.

14. The one or more computer readable storage medium of claim 13, wherein each of the respective matching designs associated with each respective kittable design comprises an identical font scheme and an identical color scheme.

15. The one or more computer readable storage medium of claim 10, wherein each of the respective matching designs associated with each respective kittable design comprises one or the other of a pre-created matching design configured for its associated product or a default design associated with its associated product and having a default matching accent image inserted therein, the default matching accent image associated with the design family.

16. The one or more computer readable storage medium of claim 10, further comprising:
receiving at least one keyword;
presenting only those kittable designs that are also associated with the at least one keyword.

17. An apparatus for generating a design-coordinated gallery of available designs for a selected kit configuration, comprising:
one or more processors in communicative connection with one or more computer readable storage media, the one or more computer readable storage media configured to store a plurality of different product identifiers each identifying a product, and to store a plurality of content designs each associated with a product identifier identifying a product on which the content design may be embodied, the plurality of content designs grouped into a plurality of content design families wherein the content designs in each content design family are visually coordinated with one another;
the one or more processors configured to receive a list of products in the selected kit configuration, the selected kit configuration comprising a defined set of a plurality of products offered together for purchase as a single unit,
the one or more processors further configured to obtain a product identifier for each of the products in the received list of products, and to identify, based on the received list of products, the obtained product identifiers, and the plurality of content designs, a set of content families that include content designs associated with each of the product identifiers for each of the products identified in the received list of products,
the one or more processors further configured to select from the identified set of content families one or more kittable designs associated with different products, each kittable design having associated therewith a set of respective matching designs for each of the products in the selected kit configuration, and each of the respective matching designs in a given set belonging to an associated selected content family; and
one or more processors which create and present a gallery kittable designs selected from the determined one or more kittable designs.

18. The apparatus of claim 17, further comprising:
the one or more computer readable storage media which store the plurality of different product identifiers and the plurality of content designs.

* * * * *